United States Patent [19]

Colpaert

[11] 4,364,456
[45] Dec. 21, 1982

[54] DRUM BRAKE HAVING DUO MODE

[75] Inventor: James J. Colpaert, Granger, Ind.

[73] Assignee: The Bendix Corporation, Southfield, Mich.

[21] Appl. No.: 253,983

[22] Filed: Apr. 13, 1981

[51] Int. Cl.³ .................... F16D 51/48; F16D 65/22
[52] U.S. Cl. ............................. 188/106 A; 188/326
[58] Field of Search .......... 188/79.5 P, 106 A, 106 F, 188/326

[56] References Cited

U.S. PATENT DOCUMENTS

| 2,181,029 | 11/1939 | Thomas | 188/106 A X |
| 2,842,229 | 7/1958 | Ross | 188/106 A X |
| 3,400,787 | 9/1968 | Keller et al. | 188/106 A |
| 3,708,044 | 1/1973 | Torri et al. | 188/326 |

Primary Examiner—Duane A. Reger
Attorney, Agent, or Firm—Paul David Schoenle; Ken C. Decker

[57] ABSTRACT

A drum brake assembly includes a pair of brake shoes which are carried by a backing plate and engageable with a hydraulic actuator. The hydraulic actuator is operable to move the pair of brake shoes from a rest position to a braking position. A strut extending between the pair of brake shoes cooperates with a parking arm to move the pair of brake shoes to the braking position during a parking brake application. A support assembly on the backing plate is disposed opposite the hydraulic actuator for the purpose of absorbing braking torque developed by the pair of brake shoes. The support assembly comprises a pair of slots and a lever. The lever is movable in response to movement of the parking arm to adjust the position of the pair of blocks relative to each other. In a first position the blocks are in abutment with the backing plate while in a second position the blocks are free to move a limited amount relative to the backing plate. Moreover, the lever imparts a separating force to the pair of brake shoes via the blocks during a parking brake application to expand the brake shoes radially. This expansion is in addition to the movement imparted to the brake shoes by the strut and parking arm.

7 Claims, 3 Drawing Figures

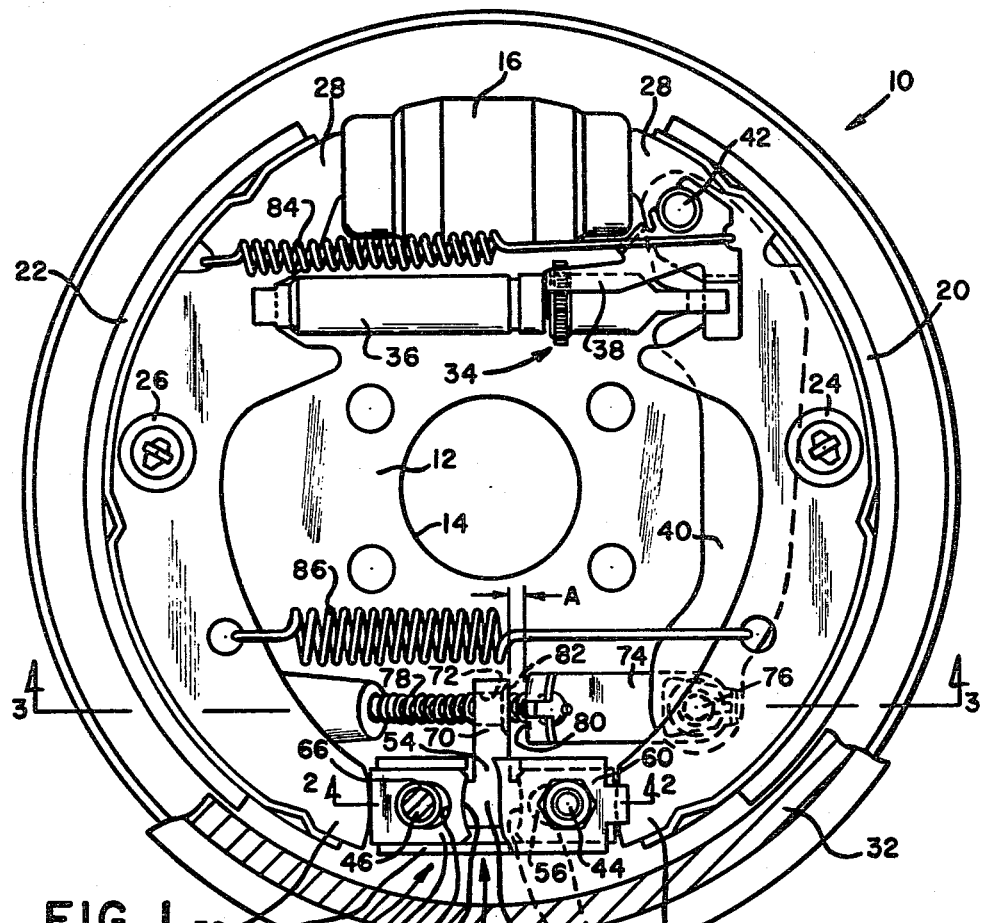
FIG. 1
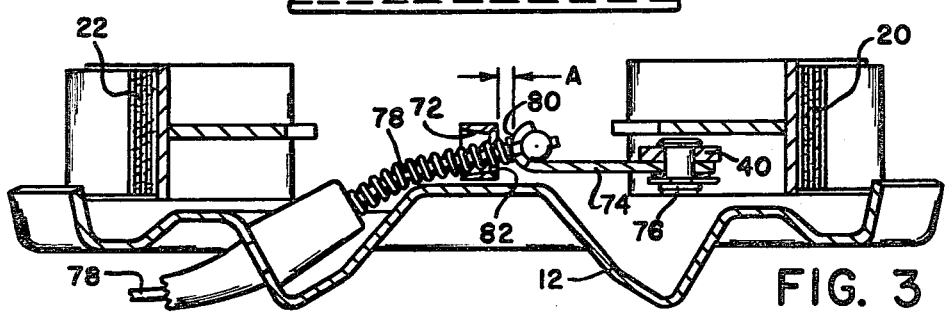
FIG. 2
FIG. 3

DRUM BRAKE HAVING DUO MODE

BACKGROUND OF THE INVENTION

A non-servo drum brake provides a support assembly on a backing plate to pivotally anchor a pair of brake shoes. A hydraulic actuator is engageable with the pair of brake shoes to pivot the brake shoes about the support assembly from a rest position to a braking position. An adjustable strut extends between the pair of brake shoes to compensate for lining wear and a parking arm cooperates with the strut to move the pair of brake shoes to the braking position during a parking brake application.

The non-servo drum brake is frequently used as a rear brake on vehicles with front wheel disc brakes. The non-servo rear drum brake is sufficient to assist the front wheel disc brakes in stopping the vehicle. It is designed to develop less torque than the disc brake to reduce the chance of wheel skidding. A problem exists during a parking brake mode because the rear non-servo drum brake is required to hold the vehicle stationary without any assistance from the front wheel disc brake. One solution to this problem is to free the support assembly during a parking brake mode as taught by U.S. Pat. application Ser. No. 12,991, filed on Feb. 21, 1979. Such an arrangement converts the non-servo drum brake to a Duo-Servo drum brake only during a parking brake application.

A duo-mode drum brake is disclosed in U.S. Pat. application Ser. No. 80,809, filed on Feb. 21, 1979, wherein a non-servo drum brake is converted to Duo-Servo operation during a parking brake application. The brake is converted to Duo-Servo mode by a mechanism which converts the support assembly for the brake shoes so that brake torque generated by one brake shoe is transferable through the support assembly to the other brake shoe, rather than being transferred to the backing plate. Consequently, the other brake shoe is urged into tighter engagement with the brake drum. The mechanism has only a limited movement between the position in which the support assembly defines a non-servo brake and the position in which the assembly defines a Duo-Servo brake. The mechanism is connected to the parking arm by a link and a connector such that movement of the parking arm, or in the alternative, movement of the mechanism, in response to parking cable movement is determined by the balance of friction and spring forces on the parking lever and on the mechanism, respectively. Tests of drum brakes constructed according to the invention of the application Ser. No. 80,809 have shown that part of the limited motion of the mechanism may be used prior to the time that the brake shoes are moved into full engagement with the brake drum. Consequently, the brake shoes may not be applied to the brake drum in a manner to most efficiently provide brake torque for parking purposes.

SUMMARY OF THE INVENTION

The present invention covers an improvement in a non-servo drum brake wherein a support assembly or anchor bracket is altered to expand a pair of brake shoes during a parking brake application. More specifically, the present invention comprises an improvement to the drum brake disclosed in U.S. Pat. application Ser. No. 80,809. A drum brake constructed according to the present invention will provide a higher ratio of brake torque to applying force in the parking brake mode than will a similar brake constructed according to the invention disclosed in the application Ser. No. 80,809.

In particular a drum brake includes a backing plate which carries a hydraulic actuator and a support assembly opposite the hydraulic actuator. The backing plate also movably carries a pair of brake shoes engageable with the hydraulic actuator and the support assembly. An adjustable strut extends between the brake shoes adjacent the hydraulic actuator to define a rest position for the brake shoes. The adjustable strut also cooperates with a pawl mounted on one of the brake shoes to take up lining wear for the brake shoes. A parking arm mounted on either brake shoe cooperates with the adjustable strut to move the brake shoes to a braking position engaging a rotatable member during a parking brake application.

The support assembly comprises a pair of pins fixedly secured to the backing plate and loosely carrying a pair of blocks within a cage attached to the backing plate by the pins. Each block is engageable with a respective brake shoe and a retraction spring extending between the shoes biases the shoes and blocks to a rest position in abutment with the pins. A cam lever is pivotally carried within the cage between the blocks. The cam lever extends outwardly of the cage and terminates in an end defining an aperture. A parking brake cable which is movable by a vehicle operator passes through the aperture. The parking brake cable connects to the parking arm via a connector to move the brake shoes to a braking position when the vehicle operator moves the cable. An abutment defined by the connector contacts the cam lever after the parking arm moves substantially to a braking position. Further movement of the parking brake cable and parking arm toward a braking position pivots the cam lever. Consequently, cam surfaces on the cam lever facing the blocks move the latter away from each other in response to pivotal movement of the cam lever. As the blocks separate from each other, the pair of brake shoes are expanded to further engage the rotatable member. The brake shoes are moved into substantially full contact with the brake drum prior to expansion of the support assembly.

When the parking brake application is terminated, a pair of retraction springs adjacent the hydraulic actuator and the support assembly withdraw the pair of brake shoes to the rest position.

It is an object of the present invention to provide a drum brake wherein a pair of brake shoes are movable by a hydraulic actuator to a braking position during a service brake application so that the pair of brake shoes pivot about a support assembly and to expand the pair of brake shoes during a parking brake application by means of a strut and parking arm and also by providing the support assembly with extendible blocks movable in response to actuation of the parking arm.

A further object of the present invention is to provide a drum brake wherein the brake shoes are moved into substantially full engagement with the brake drum before the extendible blocks are moved in response to movement of the parking arm.

BRIEF DESCRIPTION OF THE DRAWINGS

FIG. 1 is a front view of a drum brake assembly with a partial cutaway of a support assembly according to the present invention;

FIG. 2 is a cross-sectional view taken along line 2—2 of FIG. 1;

FIG. 3 is a cross-sectional view taken along line 3—3 of FIG. 1 with parts omitted for clarity of illustration.

DETAILED DESCRIPTION

In FIG. 1, a drum brake assembly 10 includes a backing plate 12 with an opening 14 for receiving an axle shaft (not shown). The backing plate 12 supports a hydraulic actuator or wheel cylinder 16 at the top of the backing plate and a support assembly or anchor device 18 is carried at the bottom of the backing plate opposite the hydraulic actuator. A pair of brake shoes 20 and 22 are movably mounted on the backing plate via hold-down springs 24 and 26. The pair of brake shoes 20 and 22 define pairs of confronting brake shoe ends 28 and 30. The hydraulic actuator 16 is received between the one pair of confronting brake shoes ends 28. Support assembly 18 is received between the other pair of confronting brake shoes ends 30. Actuation of the hydraulic actuator during a service brake application causes the brake shoes to move outwardly into engagement with a drum 32 by pivoting on the support assembly 18.

An adjuster device 34 includes an extendible strut 36 and a pawl 38. The pawl cooperates with the strut to extend the latter when the clearance between the brake shoes and rotor is greater than desired. A parking arm 40 is pivotally supported on the brake shoe 20 via pin 42 and is engageable with the strut 36. During a parking brake application the arm 40 is pivoted clockwise in FIG. 1 to push the strut 36 and shoe 22 to the left while the shoe 20 and pin 42 are moved to the right until the shoes engage the drum 32.

In accordance with the invention the support assembly 18 includes a pair of pins 44 and 46 extending outwardly from the backing plate 12 to carry a cage 48 with a pair of blocks 50 and 52 and a cam lever 54 disposed therein. Each block defines an eliptical opening 56 and 58 for receiving the respective pins 44 and 46. The cage 48 includes a top plate 60 and a U-shaped bottom cup 62. Spacers 64 and 66 fit over the pins and oppose the top plate and bottom cup so that when the plate is secured to the bottom cup via nuts 68 on the pins the blocks are free to move a limited amount within the cage. Consequently, viewing FIG. 1, the blocks can move horizontally within the cage through a distance defined by the clearance between the eliptical openings and the spacers.

The lever 54 extends radially inwardly and terminates in an end 70 which defines an aperture 72. The parking arm 40 terminates in a member 74 which is pivotally connected to the arm 40 via a pin 76. The member 74 is connected to a parking brake cable 78 which is movable by a vehicle operator to effect a parking brake application. An abutment surface 80 on the member 74 is engageable with a seat 82 defined around the aperture 72. The cable passes through the aperture 72.

A first retraction spring 84 adjacent the hydraulic actuator biases the brake shoes into engagement with the hydraulic actuator. A second retraction spring 86 extends between the pair of brake shoes adjacent the support assembly 18. The spring 86 biases the shoes into engagement with the blocks 50 and 52 and also biases the blocks to a rest position abutting pins 44 and 46, such that the left wall of opening 58 is engaging pin spacer 66 and the right wall of opening 56 is engaging pin spacer 64.

MODE OF OPERATION

During a service brake application, the hydraulic actuator 16 moves the pair of brake shoes to pivot relative to the blocks 50 and 52 until the shoes engage the drum 32. Torque developed during braking is transmitted to either pin 44 or 46, depending on the direction of rotation for the drum.

During a parking brake application, the cable 78 is pulled to the left in FIG. 1 so that the parking arm 40 is rotated clockwise, viewing FIG. 1. Consequently, the parking arm 40 and strut 36 initially move the brake shoes 20 and 22 into substantially complete engagement with the brake drum 32. The abutment surface 80 on member 74 defines a clearance A with the seat 82 of lever 54. The clearance A is selected so that the arm 40 and strut 36 pivot the brake shoes 20 and 22 about their respective points of contact with the blocks 50 and 52 and into substantially full engagement with the drum 32 before the contact of surface 80 with the seat 82. Further clockwise movement of the lever 40 is accommodated by elastic distortion of the brake shoes 20 and 22, strut 36, and arm 40 and substantially without further separation of the one pair of confronting brake shoe ends 28. Leftward movement of the member 74 causes counterclockwise pivoting of the lever 54. A substantially rectangular base 88 on the lever is rotated so that cam surfaces 90 and 92 push against the respective blocks 50 and 52 to move the blocks and adjoining ends of the brake shoes outwardly. Consequently, the shoes are expanded further in response to movement of the parking arm 40 and lever 54 to increase the frictional engagement between the shoes and drum. Moreover, the blocks and base act as a rigid member connecting the shoes together, and the blocks are moved slightly away from the pins so that the pair of shoes respond in a Duo-Servo mode to movement of the drum.

Upon inspection of FIG. 1, it will be apparent that the cam surfaces 90 and 92 on base 88, in combination with the lever 54, provide a very high leverage ratio between the parking brake cable 78 and the brake shoes 20 and 22. Consequently, when the lever 54 is pivoted counterclockwise after the brake shoes 20 and 22 are in engagement with the drum 32, the brake shoes are pivoted about their respective points of contact with the strut 36 so that the pair of confronting brake shoe ends 30 adjacent the support assembly 18 are forced tightly into engagement with the brake drum 32.

It is evident from the foregoing description that many modifications and/or changes are feasible by one skilled in the art. For example, the parking brake cable 78 could be connected directly to the parking arm 40 and the member 74 could be replaced with a collar crimped on the cable 78 so as to define the clearance A with the lever end 70 when the parking arm is in its rest position. As such, these and other modifications and/or changes are intended to be covered by the appended claims.

I claim:

1. A drum brake assembly of the type comprising a pair of arcuate brake shoes movably carried upon a backing plate, said pair of brake shoes defining pairs of confronting brake shoe ends, a hydraulic actuator received between one pair of said confronting brake shoe ends to move said brake shoes into engagement with a rotatable brake drum to effect a service brake application, a strut extending between said brake shoes adjacent said hydraulic actuator, and a parking arm pivotally engaging one of said brake shoes and said strut to move said pair of brake shoes into engagement with said brake drum to effect a parking brake application in response to pivotal movement of said parking arm, a support assembly secured to said backing plate between the other pair of confronting brake shoe ends to transfer braking torque from said brake shoes to said backing plate, said support assembly including a lever cam received between said other pair of confronting brake shoe ends to move said other pair of confronting brake shoes ends apart in response to pivotal movement of said lever cam, and interconnecting means for pivoting said lever cam to move said other pair of brake shoe ends apart in response to pivotal movement of said parking arm effecting a parking brake application, the improvement wherein said interconnecting means includes said parking arm cooperating with said lever cam to define a lost motion connection therebetween to enable said parking arm to effect a substantially full parking brake application prior to said lever cam being pivoted by movement of said parking arm.

2. The invention of claim 1 wherein said interconnecting means includes a member defining a determined clearance with and engageable with said lever cam, said member being coupled to said parking arm and moving toward said lever cam in response to movement of said parking arm effecting a parking brake application, said member engaging said lever cam to pivot the latter in response to movement of said parking arm.

3. The invention of claim 2 wherein said interconnecting means includes a cable coupled to said member and movable to effect a parking brake application, said lever cam defining an aperture and said cable passing through said aperture.

4. The invention of claim 1 wherein said support assembly includes a cage secured to said backing plate, a pair of blocks movably received within said cage, each one of said pair of blocks engaging a respective one of said other confronting brake shoe ends to receive braking torque therefrom, said pair of blocks and said backing plate having coacting abutment means for transferring braking torque from said pair of blocks to said backing plate, said cam lever interposing between said pair of blocks to engage the latter in response to pivotal movement relative said cage to move said pair of blocks and disengage said coacting abutment means whereby braking torque is transferred between said other pair of confronting brake shoe ends via said pair of blocks and said cam lever.

5. The invention of claim 4 wherein said cam lever includes a base received between said pair of blocks, said base defining a pair of cam surfaces respectively engageable with said pair of blocks to move the latter in response to pivotal movement of said cam lever.

6. The invention of claim 2 wherein said cam lever defines a seat which is engageable with said member during a parking brake application, said determined clearance being defined between said member and said seat and said cam lever and said member cooperating to define said lost motion connection.

7. The invention of claim 4 wherein said coacting abutment means includes a pair of spaced apart pins secured to said backing plate, each one of said pair of blocks defining an elongate aperture movably receiving one of said pair of pins, and said blocks engaging said pins to transfer braking torque to said backing plate.

* * * * *